(12) United States Patent
Chu et al.

(10) Patent No.: US 8,471,990 B2
(45) Date of Patent: Jun. 25, 2013

(54) PIXEL STRUCTURE

(75) Inventors: Kung-Ching Chu, Hsinchu (TW);
Te-Wei Chan, Hsinchu County (TW);
Cheng-Han Tsao, New Taipei (TW);
Sheng-Ju Ho, Hsinchu (TW); Chung-Yi Chiu, Tainan (TW)

(73) Assignee: Au Optronics Corporation, Hsinchu (TW)

( * ) Notice: Subject to any disclaimer, the term of this patent is extended or adjusted under 35 U.S.C. 154(b) by 224 days.

(21) Appl. No.: 13/034,673

(22) Filed: Feb. 24, 2011

(65) Prior Publication Data
US 2012/0162591 A1 Jun. 28, 2012

(30) Foreign Application Priority Data
Dec. 27, 2010 (TW) ................................ 99146142 A

(51) Int. Cl.
*G02F 1/1343* (2006.01)
(52) U.S. Cl.
USPC ........................................ 349/139; 349/146
(58) Field of Classification Search
USPC ................. 349/139, 140, 141, 143, 144, 142, 349/145, 146, 129, 132
See application file for complete search history.

(56) References Cited

U.S. PATENT DOCUMENTS

| 7,649,602 | B2 | 1/2010 | Chen et al. | |
|---|---|---|---|---|
| 7,697,093 | B2 | 4/2010 | Chan et al. | |
| 7,855,772 | B2 * | 12/2010 | Wang et al. | 349/144 |
| 8,094,284 | B2 * | 1/2012 | Yang et al. | 349/146 |
| 8,149,367 | B2 * | 4/2012 | Tanno | 349/139 |
| 2007/0200989 | A1 * | 8/2007 | Shinichi et al. | 349/129 |
| 2008/0143946 | A1 * | 6/2008 | Wang et al. | 349/141 |
| 2009/0103025 | A1 * | 4/2009 | Tanno et al. | 349/110 |
| 2009/0128726 | A1 * | 5/2009 | Tanno | 349/43 |
| 2010/0019998 | A1 | 1/2010 | You et al. | |
| 2012/0162591 | A1 * | 6/2012 | Chu et al. | 349/139 |

FOREIGN PATENT DOCUMENTS

CN 101639597 2/2010

OTHER PUBLICATIONS

"First Office Action of China Counterpart Application", issued on Mar. 31, 2012, p. 1-p. 3, in which the listed reference CN/101639597 was cited.

* cited by examiner

*Primary Examiner* — Brian Healy
(74) *Attorney, Agent, or Firm* — Jianq Chyun IP Office

(57) ABSTRACT

A pixel structure electrically connected to a scan line and a data line is provided. The pixel structure includes an active device and a pixel electrode, wherein the active device is electrically connected to the scan line and the data line, and the pixel electrode is electrically connected to the active device. The pixel electrode has a plurality of strip-shaped slit groups. Each of the strip-shaped slit groups includes a plurality of strip-shaped slits whose extending directions are substantially parallel to each other, and contours of at least parts of the strip-shaped slits are non-isosceles trapezoids.

18 Claims, 11 Drawing Sheets

PIXEL STRUCTURE

CROSS-REFERENCE TO RELATED APPLICATION

This application claims the priority benefit of Taiwan application serial no. 99146142, filed on Dec. 27, 2010. The entirety of the above-mentioned patent application is hereby incorporated by reference herein and made a part of this specification.

BACKGROUND OF THE INVENTION

1. Field of the Invention

The disclosure is related to a pixel structure, and in particular to a polymer-stabled alignment (PSA) pixel structure.

2. Description of Related Art

As display technology is rapidly developed, the public is having greater and greater demand in display quality of displays. Not only are there high expectations in resolution, color saturation, and response time of displays, expectations in contrast ratio and transmittance are gradually increasing.

Therefore, some manufacturers have developed PSA display panels to increase contrast ratios and transmittance of display panels. However, as shown in FIG. 1, in a conventional PSA display panel, disclination lines easily occur at two sides R of a pixel electrode thereof, so that contrast ratios and transmittance of display panels are reduced. In light of the above, one of the goals for developers is how to develop a PSA display panel which has high transmittance and is less prone to having disclination lines.

SUMMARY OF THE INVENTION

The disclosure provides a pixel structure. A display panel which has this pixel structure has greater transmittance and is less to prone to having problems of disclination lines.

The disclosure provides a pixel structure which is electrically connected to a scan line and a data line. The pixel structure includes an active device and a pixel electrode. The active device is electrically connected to the scan line and the data line. The pixel electrode is electrically connected to the active device. The pixel electrode has a plurality of strip-shaped slit groups. Each of the strip-shaped slit groups includes a plurality of strip-shaped slits whose extending directions are substantially parallel to each other, and contours of at least parts of the strip-shaped slits are non-isosceles trapezoids.

According to an embodiment of the disclosure, the above non-isosceles trapezoids are right trapezoids.

According to an embodiment of the disclosure, each of the above right trapezoids includes a top base, a bottom base, a first leg, and a second leg. The first leg is substantially perpendicular to the top base and is not parallel to an extending direction of the data line.

According to an embodiment of the disclosure, the second leg is substantially parallel or perpendicular to an extending direction of the scan line.

According to an embodiment of the disclosure, an included angle between the first leg and the data line is substantially 45°.

According to an embodiment of the disclosure, the above pixel electrode includes a first main electrode part, a second main electrode part, and a plurality of strip-shaped electrode groups. An extending direction of the first main electrode part is substantially parallel to the extending direction of the scan line. An extending direction of the second main electrode part is substantially parallel to the extending direction of the data line. A plurality of strip-shaped electrode groups is connected to the first main electrode part and the second main electrode part, wherein each of the strip-shaped electrode groups includes a plurality of strip-shaped electrodes whose extending directions are substantially parallel to each other, so as to define one of the strip-shaped slit groups.

According to the present embodiment, in the same strip-shaped electrode group, parts of the electrodes extend outward from the first main electrode part, and the remaining strip-shaped electrodes extend outward from the second main electrode part.

According to an embodiment of the disclosure, each of the strip-shaped electrodes has a first end and a second end, each of the first ends is connected to the first main electrode part or the second main electrode part, and each of the second ends has a branch which is connected to the second end of the adjacent strip-shaped electrode.

According to an embodiment of the disclosure, each of the strip-shaped electrodes has a first end and a second end, each of the first ends is connected to the first main electrode part or the second main electrode part, and each of the second ends has a branch which extends towards but is not connected to the second end of the adjacent strip-shaped electrode.

According to an embodiment of the disclosure, each of the strip-shaped electrodes has a first end and a second end, each of the first ends is connected to the first main electrode part or the second main electrode part, and the second ends are connected to each other.

According to an embodiment of the disclosure, each of the strip-shaped electrodes has a first end and a second end, each of the first ends is connected to the first main electrode part or the second main electrode part, and parts of the second ends are connected to each other to form a jagged outer contour.

According to an embodiment of the disclosure, a width of each of the strip-shaped electrodes is L, and a width of each of the strip-shaped slits is S, wherein $1\ \mu m \leq L \leq 8\ \mu m$, and $1\ \mu m \leq S \leq 4\ \mu m$.

In light of the above, in the pixel electrode according to the disclosure, by utilizing parts of the non-isosceles trapezoid slits whose extending directions are substantially parallel to each other, a tilting direction of a display medium at the two sides of the pixel electrode is more consistent with a tilting direction of an adjacent display medium which is located in the same pixel electrode, so that a display panel which adopts the pixel structure according to the disclosure is less prone to having disclination lines and has improved display characteristics.

In order to make the aforementioned and other objects, features and advantages of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

First Embodiment

Figure 2:
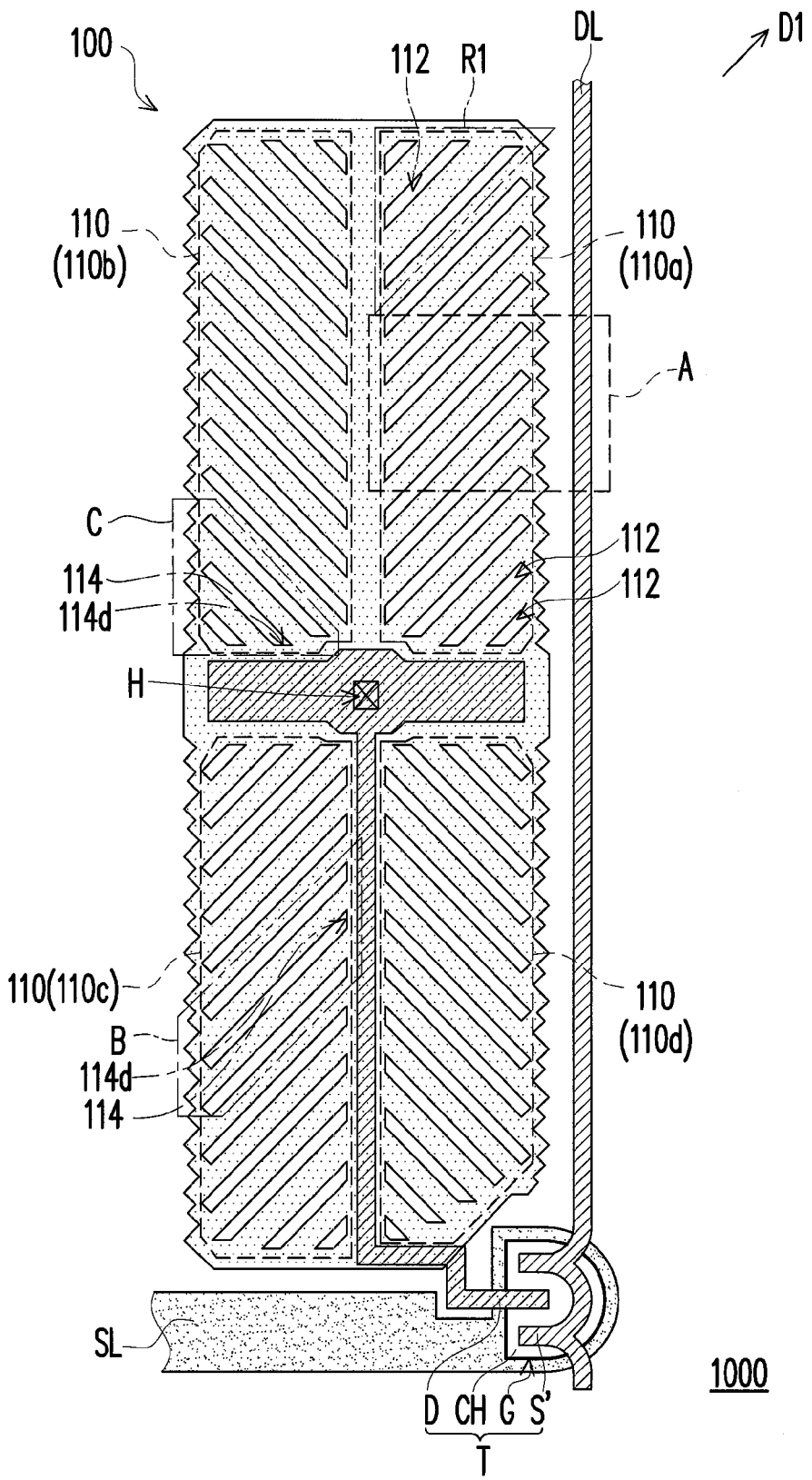
FIGS. 2, 4, and 6 are each a schematic top view of a pixel structure according to the first embodiment of the disclosure.

FIG. 2 is a schematic top view of a pixel structure 1000 according to the first embodiment of the disclosure. Please refer to FIG. 2, the pixel structure 1000 according to the present embodiment is electrically connected to a scan line SL and a data line DL. According to the present embodiment, the scan line SL and the data line DL intersect each other. In other words, an extending direction of the data line DL is not parallel to an extending direction of the scan line SL. Preferably, the extending direction of the data line DL is substantially perpendicular to the extending direction of the scan line SL. The materials of the scan line SL and the data line DL generally is metal materials, for example. However, the materials of the scan line SL and the data line DL are not limited to be metal. According to another embodiment, the scan line SL and the data line DL may include other conductive materials. For example, the other conductive materials may include alloys, nitrides of metal materials, oxides of metal materials, oxynitrides of metal materials, or stacked layers of metal materials or other conductive materials.

The pixel structure 1000 according to the present embodiment may include an active device T and a pixel electrode 100. The active device T is electrically connected to the scan line SL and the data line DL. In detail, the active device T may include a gate electrode G, a channel CH, a source electrode S' and a drain electrode D. The gate electrode G may be formed by a partial region of the scan line SL. The channel CH is above the gate electrode G. The source electrode S' and the drain electrode D are located above the channel CH, and the source electrode S' may be a branch of the data line DL. A bottom gate type active thin film transistor is used as an example for description of the active device T. The thin film transistor, however, is not limited thereto. According to another embodiment, the active device T may also be a top gate type thin film transistor. According to the present embodiment, the gate electrode G of the active device T is further covered by an insulation layer (not shown), which may be called a gate insulation layer. In addition, the active device T may be further covered by another insulation layer (not shown), which may be called a passivation layer. Materials of these insulation layers may be inorganic materials (such as silicon oxide, silicon nitride, silicon oxynitride, or stacked layers of at least two of the above materials), organic materials, or combinations thereof.

In order to clearly describe the pixel structure 1000, the following defines non-isosceles trapezoids which are described in the disclosure. A trapezoid is a convex tetragon, wherein only one pair of sides are substantially parallel to each other. This pair of sides are two parallel bases, wherein one is called a top base and the other is called a bottom base. The remaining two non-parallel sides are called legs. An isosceles trapezoid is a trapezoid whose two legs are of equal length, and a non-isosceles trapezoid is a trapezoid whose two legs are not of equal length.

The pixel electrode 100 according to the present embodiment is electrically connected to the active device T. In detail, the pixel electrode 100 may be electrically connected to the drain electrode D of the active device T through a contact window H. According to the present embodiment, the pixel electrode 100 includes a plurality of strip-shaped slit groups 110. Each of the strip-shaped slit groups 110 includes a plurality of strip-shaped slits 112 whose extending directions are substantially parallel to each other, and contours of at least parts of the strip-shaped slits 112 are non-isosceles trapezoids. For example, the pixel electrode 100 according to the present embodiment includes four strip-shaped slit groups 110a, 110b, 110c, and 110d. The strip-shaped slit group 110a includes a plurality of strip-shaped slits 112 which extend towards a direction D1 and which are substantially parallel to each other. Among these strip-shaped slits 112, parts of the strip-shaped slits 112 may be isosceles trapezoids, and the other parts of the strip-shaped slits 112 may be non-isosceles trapezoids. In detail, as shown in FIG. 2, in the strip-shaped slit group 110a, the three strip-shaped slits 112 in a top region R1 may be isosceles trapezoids, and other strip-shaped slits 112 may be non-isosceles trapezoids. However, according to design, the strip-shaped slits 112 at other positions may be isosceles trapezoids, all the slits 112 may be isosceles trapezoids, or all the slits 112 may be non-isosceles trapezoids. The disclosure is not limited to the above configuration.

Figure 3:
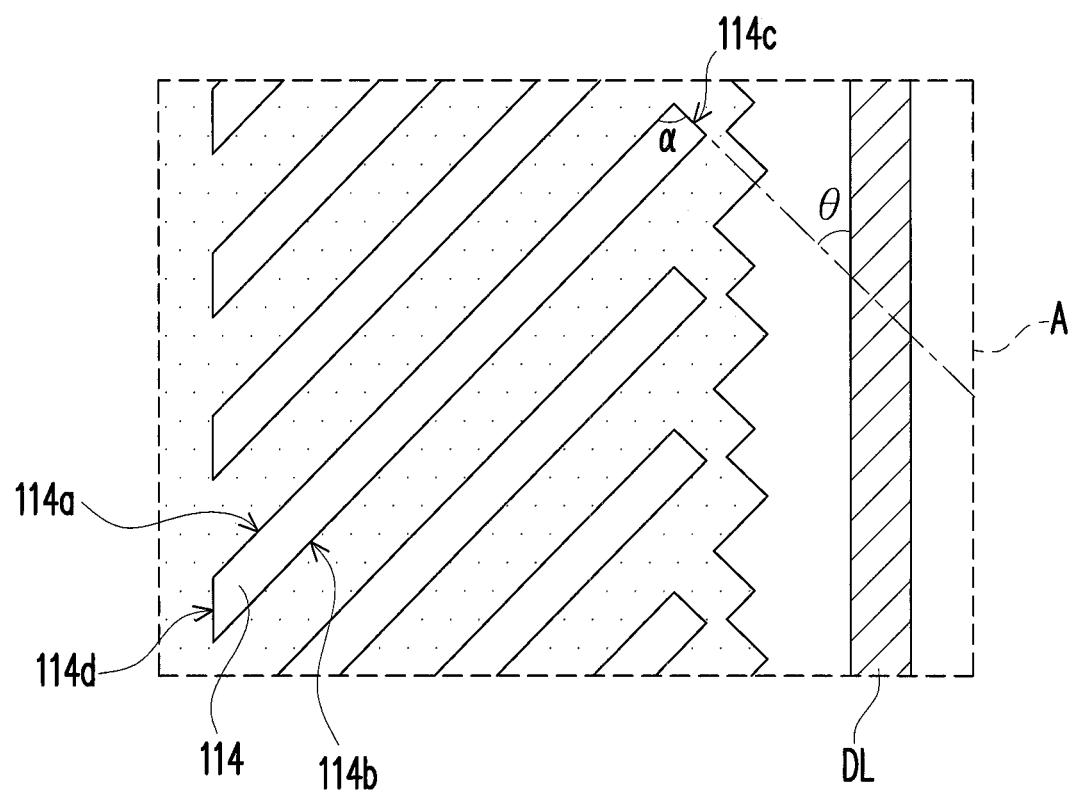
FIG. 3 is a schematic magnified view of a region A in FIG. 2.

FIG. 3 is a schematic magnified view of a region A in FIG. 2. Please refer to FIG. 2. According to the present embodiment, the above non-isosceles trapezoids are, for example, right trapezoids. In detail, each right trapezoid 114 includes a top base 114a, a bottom base 114b, a first leg 114c, and a second leg 114d. The first leg 114c is substantially perpendicular to the top base 114a. However, the disclosure is not limited to the above configuration. An included angle α between the first leg 114c and the top base 114a may be from 45 to 135 degrees. Moreover, according to the present embodiment, the first leg 114c may be not parallel to the extending direction of the data line DL. For example, an angle θ is substantially included between an extending direction of the first leg 114c and the extending direction of the data line DL. The angle θ is about 45°. However, the included angle θ between the first leg 114c and the data line DL may be adjusted according to actual requirements.

Furthermore, the second leg 114d of the right trapezoid 114 may be substantially parallel to or substantially perpendicular to the extending direction of the scan line SL. For example, in the strip-shaped slit group 110c, the second leg 114d of the right trapezoid 114 in a region B may be substantially perpendicular to the extending direction of the scan line SL, and in the strip-shaped slit group 110b, the second leg 114d of the right trapezoid 114 in a region C may be substantially parallel to the extending direction of the scan line SL.

Figure 4:
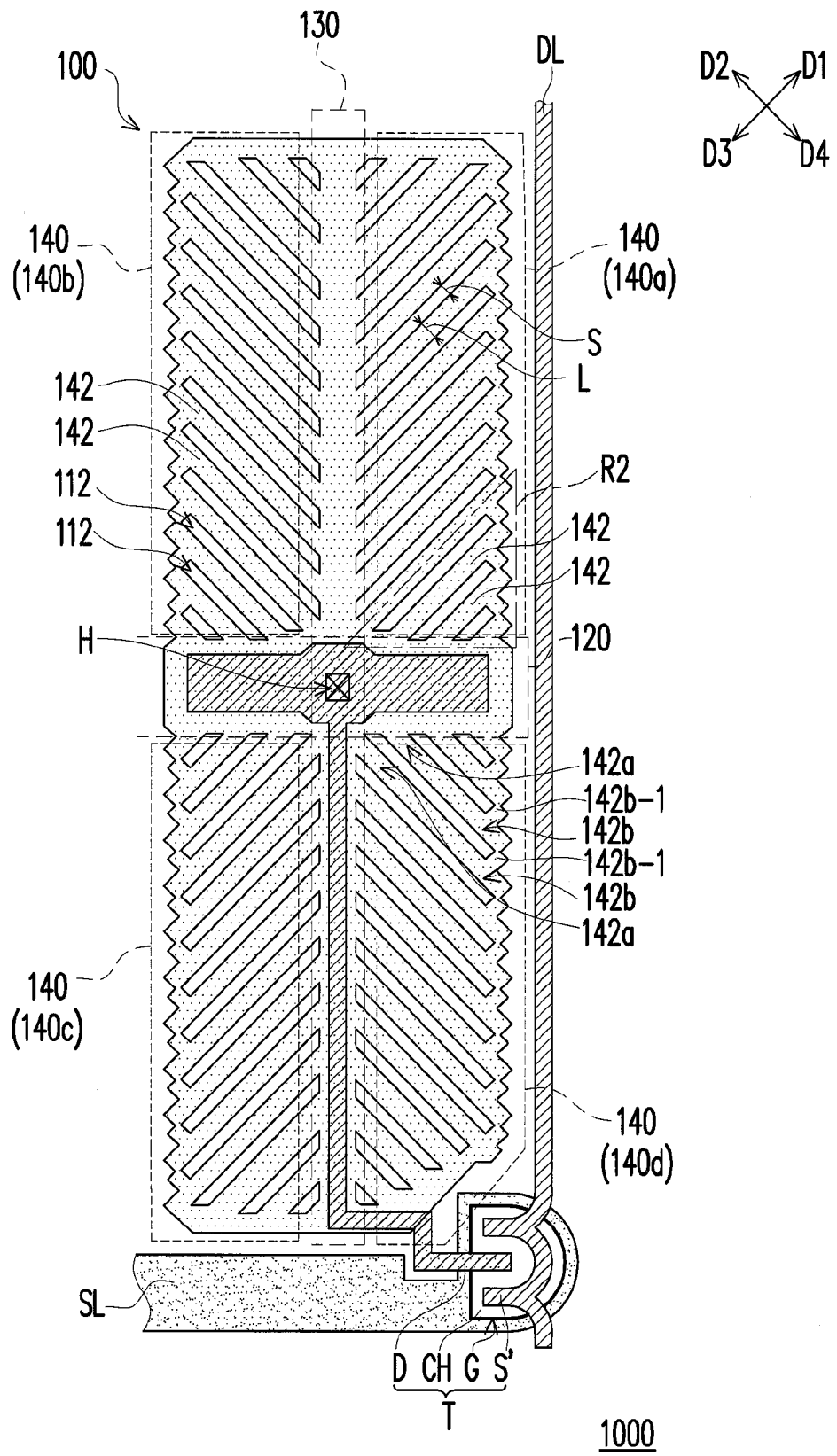

FIG. 4 is a schematic top view of a pixel structure 1000 according to the first embodiment of the disclosure. Please refer to FIGS. 2 and 4. The pixel electrode 100 according to the present embodiment includes a first main electrode part 120, a second main electrode part 130, and a plurality of strip-shaped electrode groups 140. According to the present embodiment, an extending direction of the first main electrode part 120 is substantially parallel to the extending direction of the scan line SL. An extending direction of the second main electrode part 130 is substantially parallel to the extending direction of the data line DL. Each of the strip-shaped electrode groups 140 is connected to the first main electrode part 120 and the second main electrode part 130 and may include a plurality of strip-shaped electrodes 142 whose extending directions are substantially parallel to each other, so as to define one of the strip-shaped slit groups 110. For example, the pixel electrode 100 according to the present embodiment may include the four strip-shaped slit groups 140a, 140b, 140c, and 140d. The strip-shaped electrode group 140a (or 140b, 140c, or 140d) may include multiple strip-shaped electrodes 142 which extend towards the direction D1 (or D2, D3, or D4) and which are substantially parallel to each other, so as to define one of the strip-shaped slit groups 110a (or 110b, 110c, or 110d).

It should be noted that according to the present embodiment, a width of the strip-shaped electrodes 142 is L, and a width of each of the strip-shaped slits 112 is S, wherein $1\ \mu m \leq L \leq 8\ \mu m$, and $1\ \mu m \leq S \leq 4\ \mu m$. Moreover, the following widths may also be adopted: $2\ \mu m \leq L \leq 7\ \mu m$, and $1\ \mu m \leq S \leq 4\ \mu m$, or $2\ \mu m \leq L \leq 6\ \mu m$, and $1\ \mu m \leq S \leq 4\ \mu m$. Most preferably, $L=4\ \mu m$ and $S=2\ \mu m$. Therefore, transmittance and response time of a display panel which adopts the pixel structure 1000 according to the present embodiment are both optimized, such as those shown in the following Tables 1 and 2. However, the disclosure is not limited to this configuration. Tables 1 and 2 show the width L of the strip-shaped electrodes 142 and the width S of the strip-shaped slits and respectively show transmittance and response time of a display panel which adopts the pixel structure 1000 according to the present embodiment.

Figure 5:
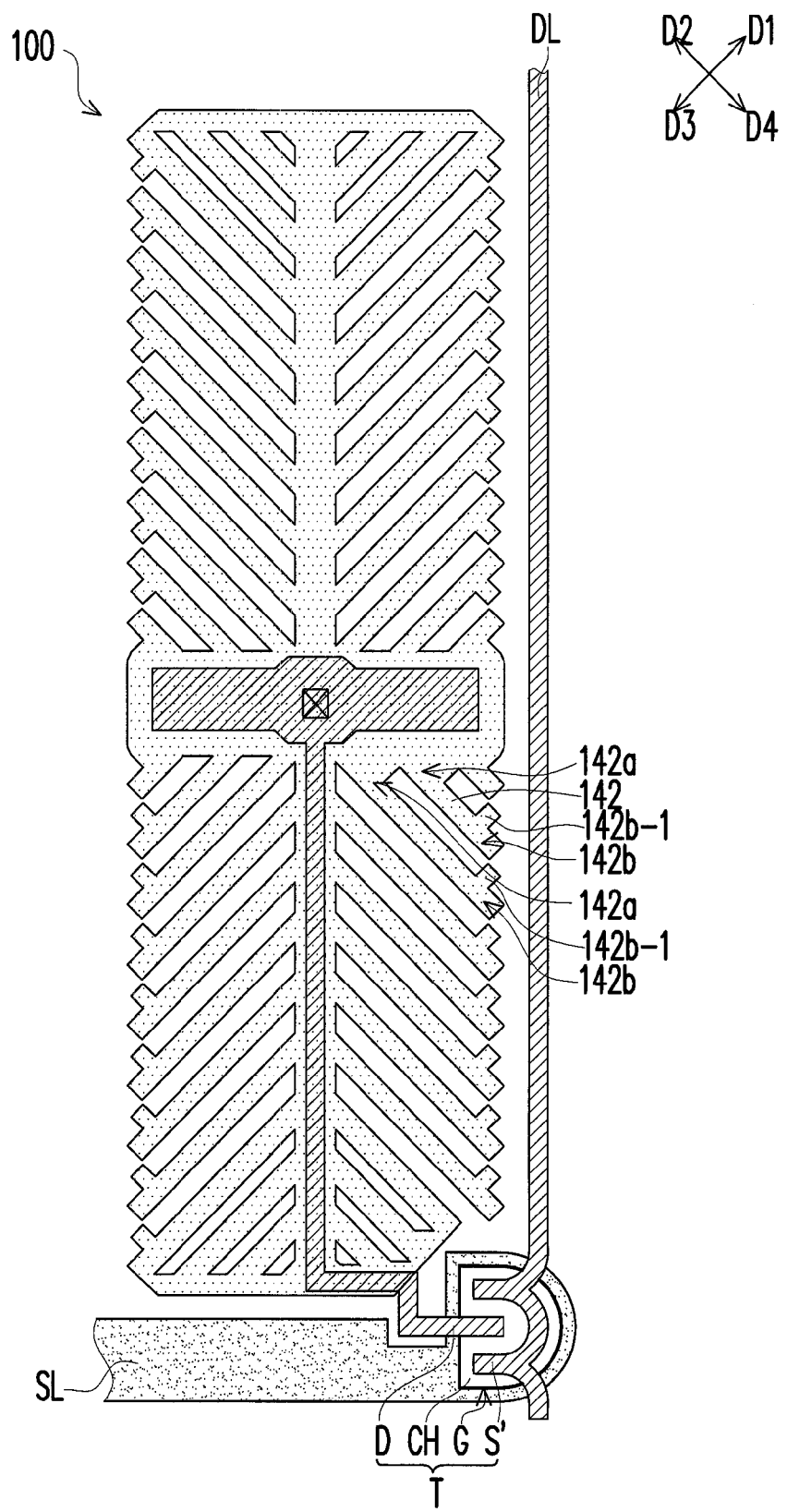
FIG. 5 is a schematic top view of a pixel structure according to an embodiment of the disclosure.

142b. Each of the first ends 142a is connected to the first main electrode part 120 or the second main electrode part 130, and the second ends 142b in the same strip-shaped electrode group 140 are connected to each other. In detail, each of the second ends 142b according to the present embodiment has a branch 142b-1, and each of the branches 142b-1 is individually connected to the second end 142b of the adjacent strip-shaped electrode 142. According to the present embodiment, each of the branches 142b-1 may extend in a direction perpendicular to the extending direction of the strip-shaped electrodes 142, so as to be connected the second end 142b of the adjacent strip-shaped electrode 142. However, the disclosure is not limited to this configuration. According to another embodiment, each of the branches 142b-1 may extend towards the second end 142b of the adjacent strip-shaped electrode 142 but is not connected to the second end 142b of the adjacent strip-shaped electrode 142, as shown in FIG. 5.

It should be noted that according to the present embodiment, each of the strip-shaped electrodes 142 has the first end 142a and the second end 142b. Each of the first ends 142a is connected to the first main electrode part 120 or the second main electrode part 130, and parts of the second ends 142b are connected to each other to form jagged outer contours X. In detail, each of the strip-shaped electrodes 142 extends out-

TABLE 1

| T % | L=4 | L=4.25 | L=4.5 | L=4.75 | L=5 | L=5.25 | L=5.5 | L=5.75 | L=6 | L=6.25 | L=6.5 | L=6.75 | L=7 | L=7.25 | L=7.5 |
|---|---|---|---|---|---|---|---|---|---|---|---|---|---|---|---|
| S=3 | | | | | 106.7% | | 108.1% | | 107.7% | | 104.0% | | 105.6% | | 102.8% |
| S=3.25 | | | | 104.2% | | 104.2% | | 103.5% | | 101.2% | | 101.3% | | 100.2% | |
| S=3.5 | | | 100.0% | | 102.0% | | 101.0% | | 99.3% | | 98.7% | | 95.4% | | |
| S=3.75 | | 95.4% | | 98.2% | | 98.6% | | 94.5% | | 95.5% | | 93.4% | | | |
| S=4 | 92.1% | | 93.7% | | 96.1% | | 93.6% | | 92.4% | | 88.2% | | | | |

T %: Relative transmittance (the transmittance is 100% when $L = 4.5\ \mu m$ and $S = 3.5\ \mu m$)

TABLE 2

| Response time | L=4 | L=4.25 | L=4.5 | L=4.75 | L=5 | L=5.25 | L=5.5 | L=5.75 | L=6 | L=6.25 | L=6.5 | L=6.75 | L=7 | L=7.25 | L=7.5 |
|---|---|---|---|---|---|---|---|---|---|---|---|---|---|---|---|
| S=3 | | | | | 15.6 | | 17.0 | | 17.4 | | 18.4 | | 19.6 | | 22.8 |
| S=3.25 | | | | 16.4 | | 16.8 | | 17.2 | | 19.6 | | 20.0 | | 24.2 | |
| S=3.5 | | | 17.6 | | 17.8 | | 18.2 | | 19.4 | | 19.4 | | 23.8 | | |
| S=3.75 | | 17.2 | | 17.6 | | 19.6 | | 20.4 | | 21.8 | | 25.4 | | | |
| S=4 | 17.2 | | 18.2 | | 20.2 | | 20.8 | | 22.6 | | 25.6 | | | | |

According to the present embodiment, in the same strip-shaped electrode group 140, parts of the electrodes 142 extend outward from the first main electrode part 120, and the remaining strip-shaped electrodes 142 extend outward from the second main electrode part 130. Using the strip-shaped electrode group 140a as an example, two of the strip-shaped electrodes 142 in a region R2 extend outward from the first main electrode part 120, and the remaining strip-shaped electrodes 142 extend outward from the second main electrode part 130.

Figure 6:
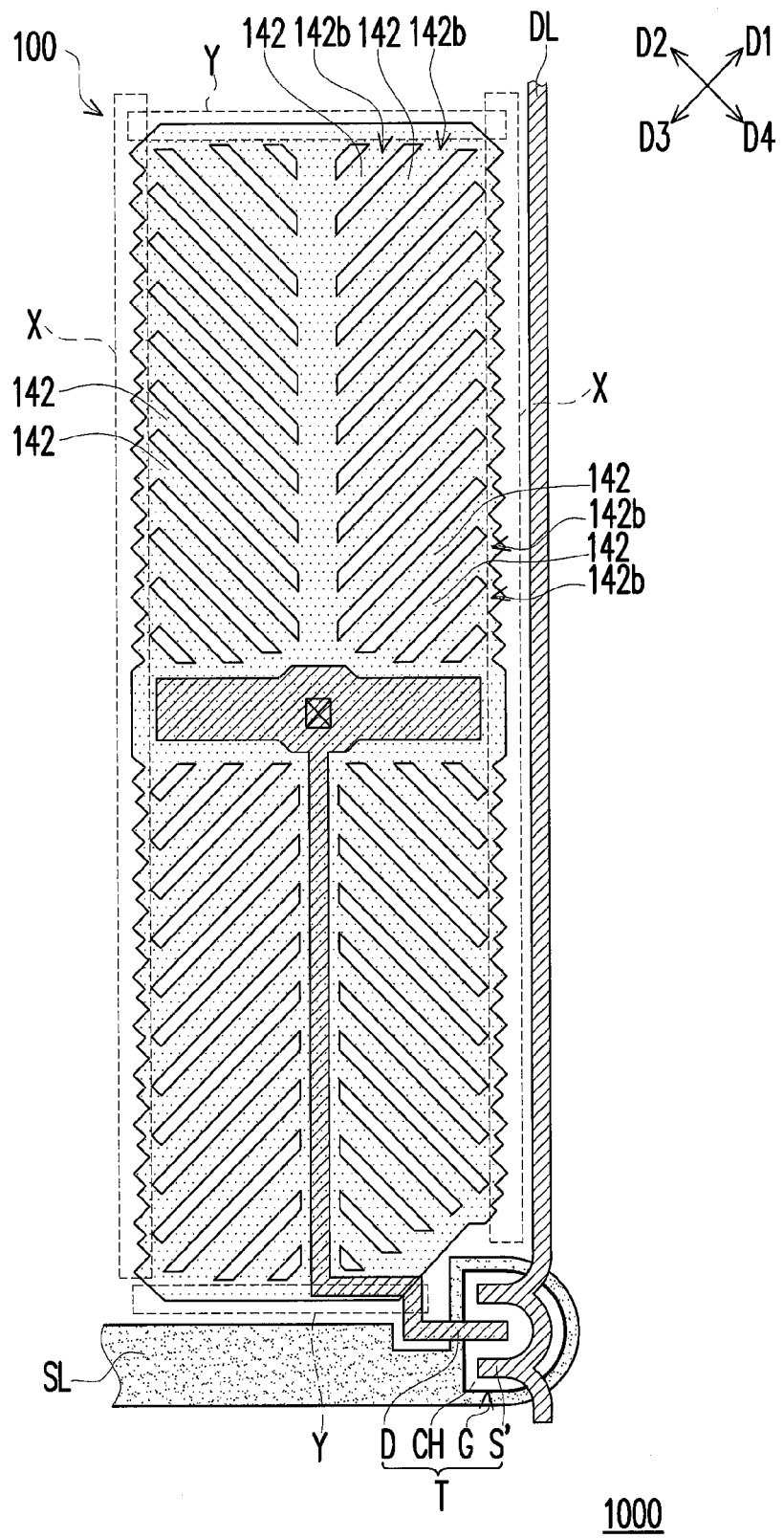

According to the present embodiment, each of the strip-shaped electrodes 142 has a first end 142a and a second end ward from the first main electrode part 120 or the second main electrode part 130, and the second ends 142b of parts of the strip-shaped electrodes 142 are connected to each other to form the jagged outer contours X at left and right sides of the pixel electrode 100. The second ends 142b of parts other ones of the strip-shaped electrodes 142 which are closer to top and bottom sides of the pixel electrode 100 are connected to each other to form linear outer contours Y, as shown in FIG. 6.

When the pixel structure 1000 is designed according to the above method, a tilting direction of a display medium (such as liquid crystals) at the two sides of the pixel electrode is more consistent with a tilting direction of an adjacent display medium which is located in the same pixel electrode, and problems of disclination lines are effectively alleviated, so that a display panel which adopts the pixel structure 1000 according to the present embodiment has superb transmittance.

Second Embodiment

Figure 7:
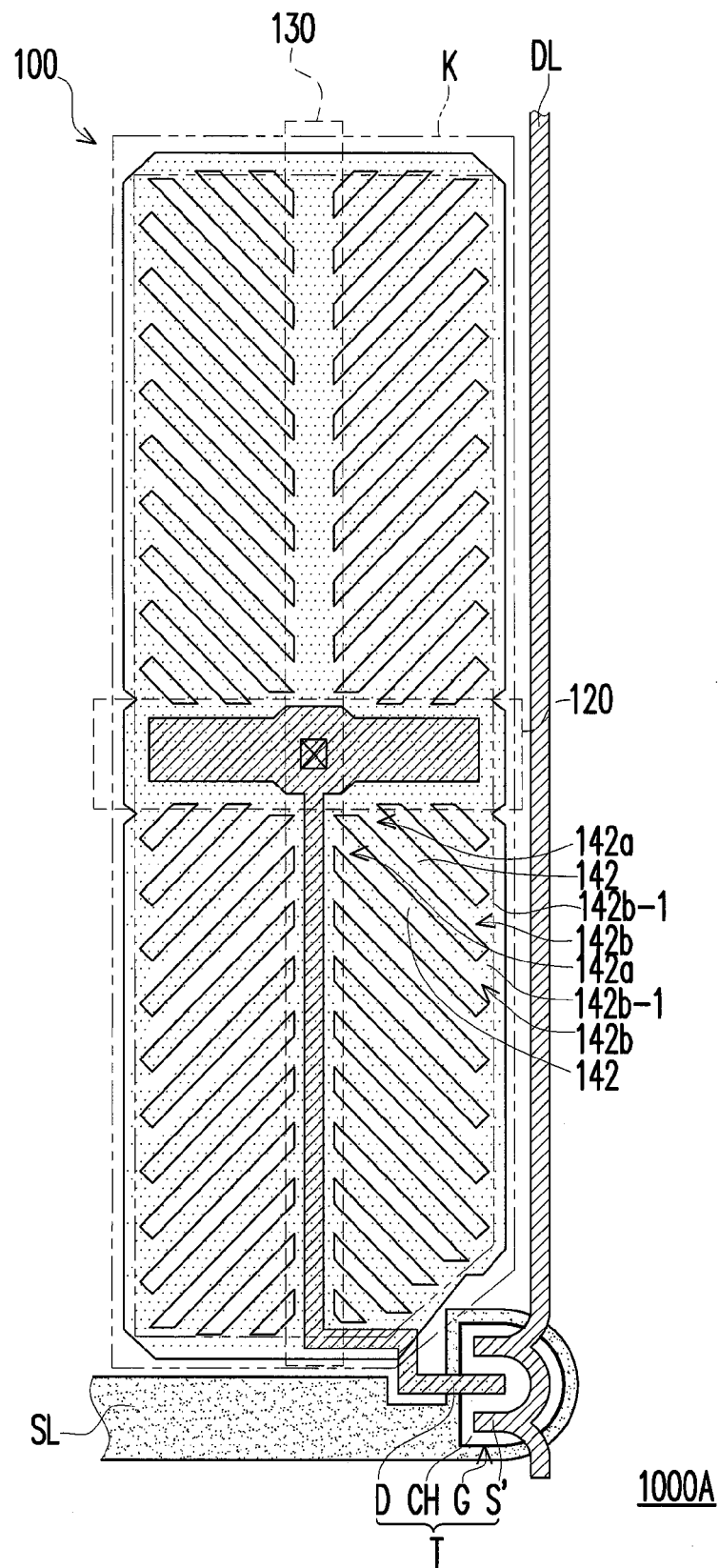
FIG. 7 is a schematic top view of a pixel structure according to the second embodiment of the disclosure.

FIG. 7 is a schematic top view of a pixel structure 1000A according to the second embodiment of the disclosure. Please refer to FIG. 7, the pixel structure 1000A according to the present embodiment is similar to the pixel structure 1000 according to the first embodiment. Only differences in between are described in the following, and similarities are not repeatedly described.

According to the present embodiment, each of the strip-shaped electrodes 142 has the first end 142a and the second end 142b. Each of the first ends 142a is connected to the first main electrode part 120 or the second main electrode part 130, and the second ends 142b in the same strip-shaped electrode group 140 are connected to each other. In detail, each of the second ends 142b according to the present embodiment has the branch 142b-1, and each of the branches 142b-1 is connected to the second end 142b of the adjacent strip-shaped electrode 142. According to the present embodiment, each of the branches 142b-1 may extend in a direction substantially parallel to the extending direction of the data line DL, so as to be connected to the second end 142b of the adjacent strip-shaped electrode 142. It should be noted that according to the present embodiment, the second ends 142b are connected to each other to form an outer contour K which is similar to a rectangle.

When the pixel structure 1000A is designed according to the above method, the tilting direction of the display medium (such as liquid crystals) at the two sides of the pixel electrode 100 is more consistent with the tilting direction of the adjacent display medium which is located in the same pixel electrode 100, so that a display panel which adopts the pixel structure 1000A according to the present embodiment is less prone to problems of disclination lines and has superb transmittance.

Experimental Embodiment

Figure 1:
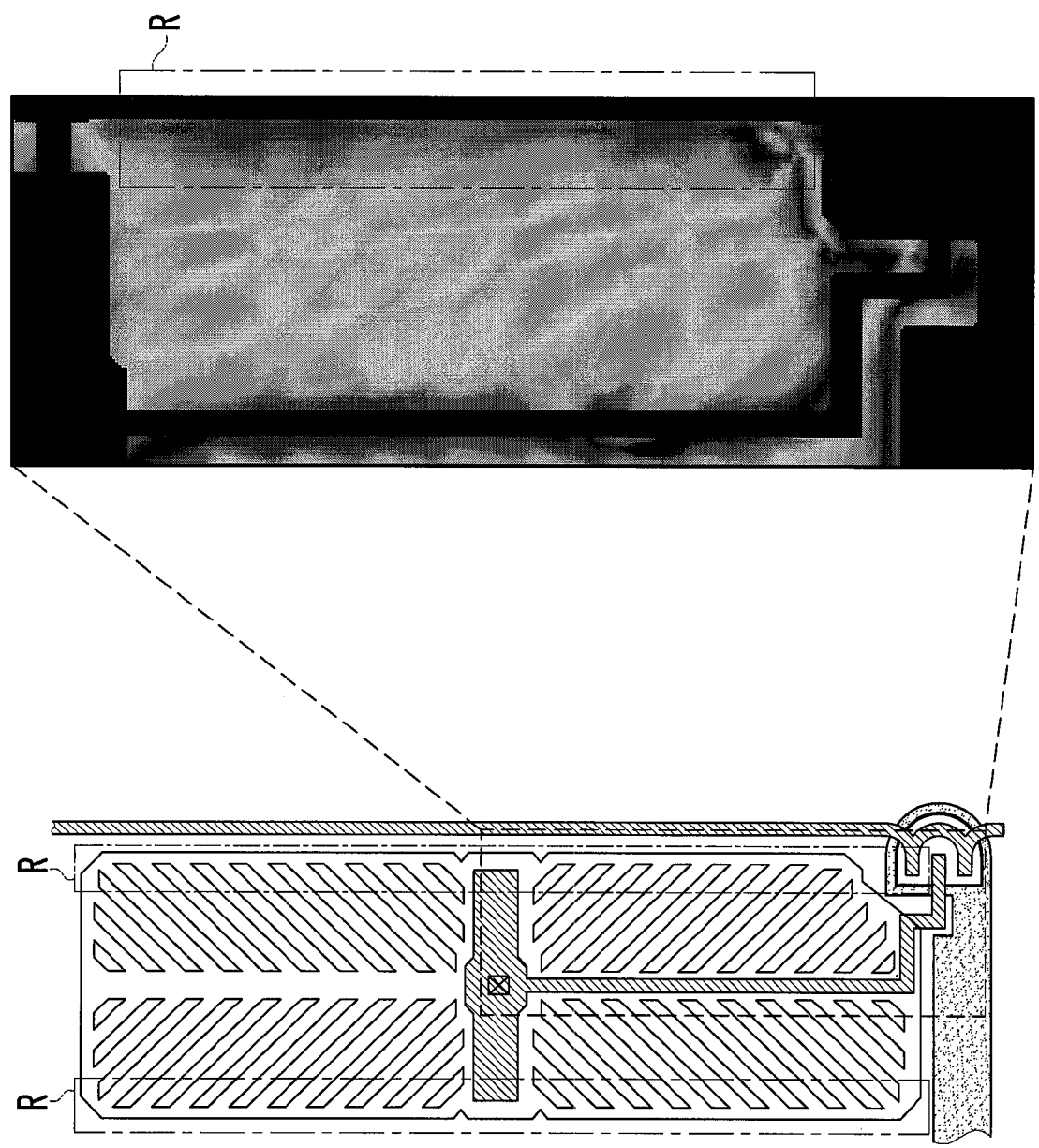
FIG. 1 is a schematic view of a conventional pixel structure.
Figure 8:
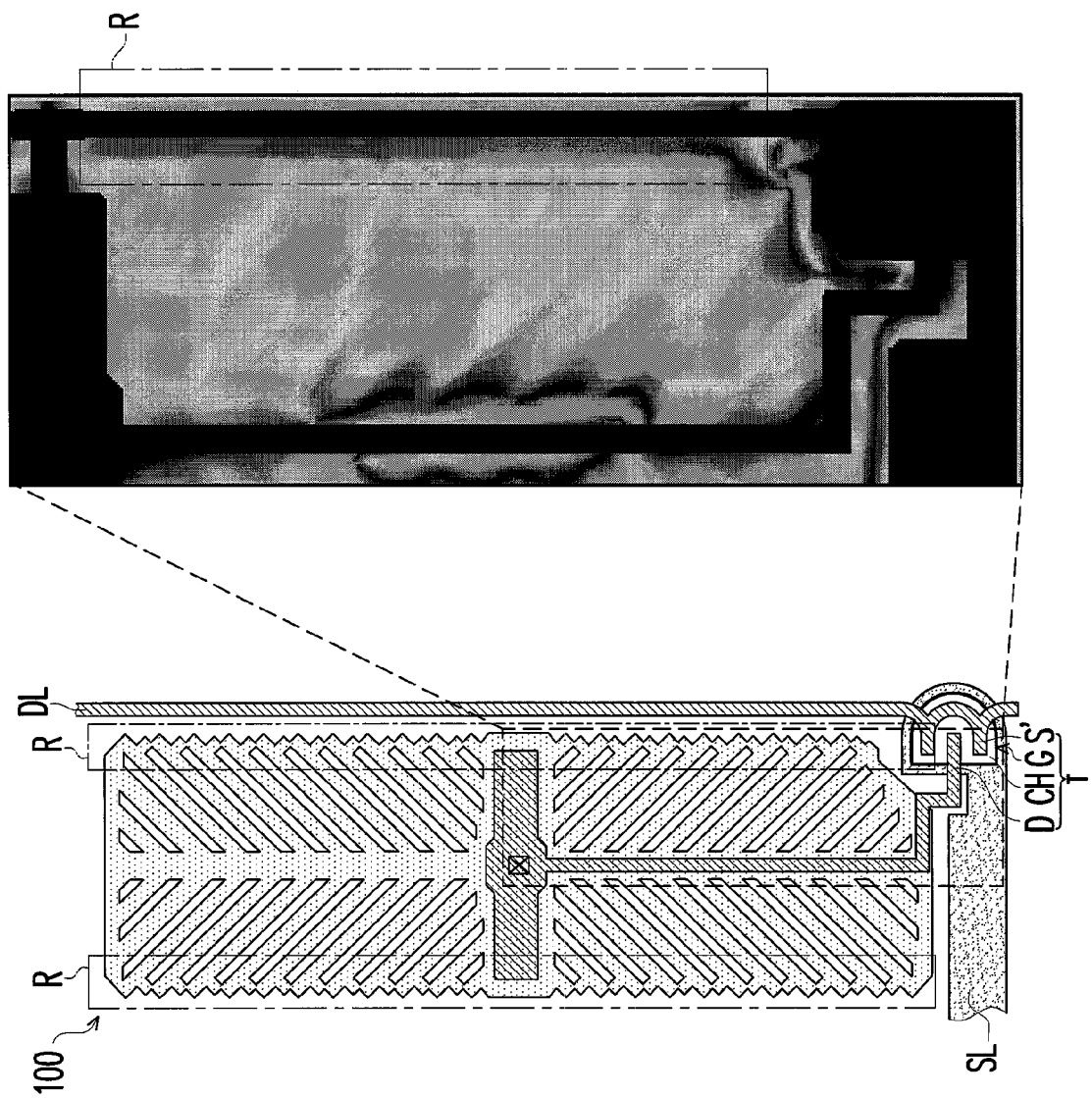
FIG. 8 is a schematic view of the pixel structure according to the first embodiment of the disclosure.
Figure 9:
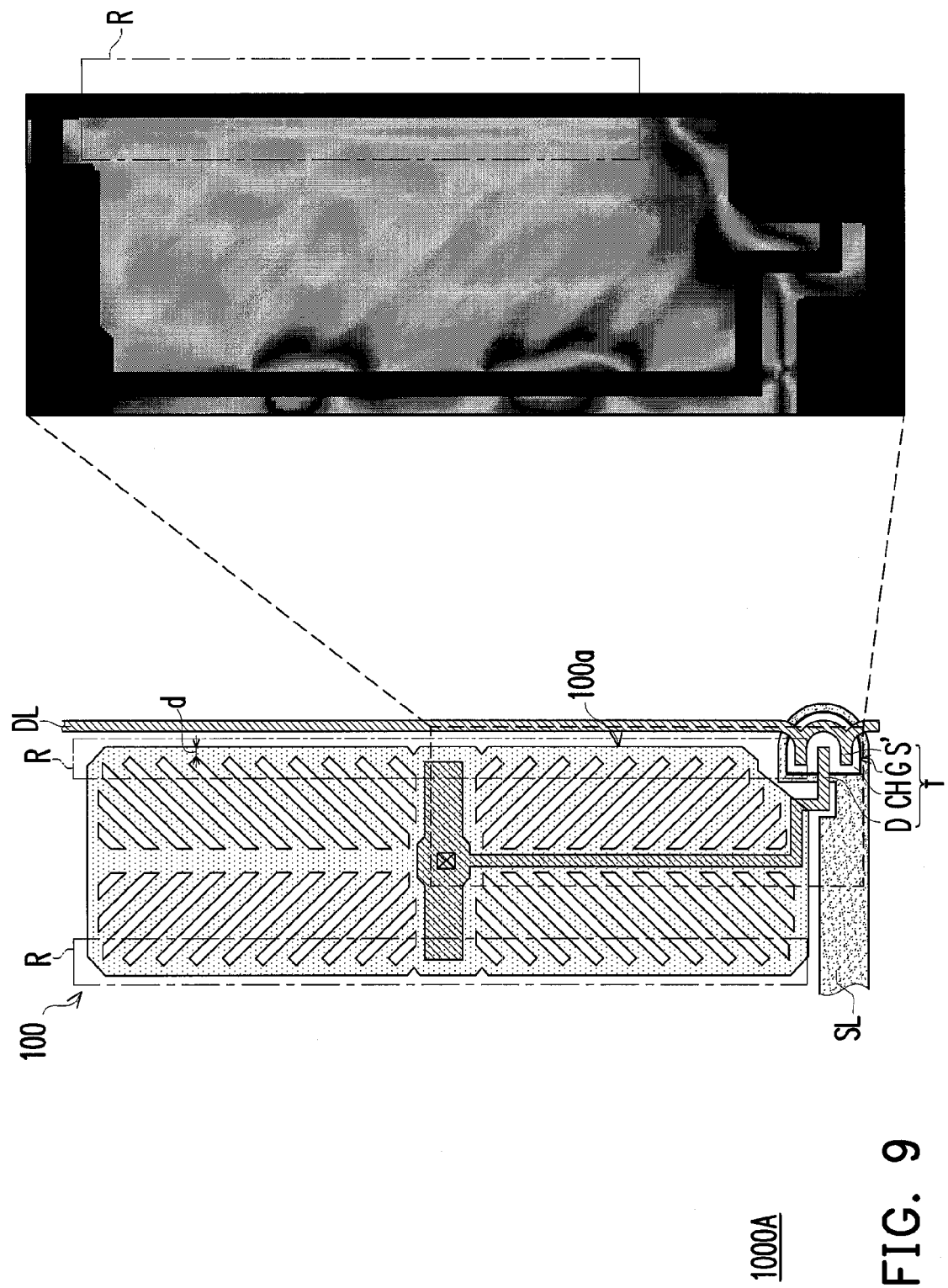
FIGS. 9 and 10 are each a schematic view of the pixel structure according to the second embodiment of the disclosure.

FIG. 1 is a schematic view of a conventional pixel structure. FIG. 8 is a schematic view of the pixel structure 1000 according to the first embodiment of the disclosure. FIG. 9 is a schematic view of the pixel structure 1000A according to the second embodiment of the disclosure. According to FIG. 1, in the conventional pixel structure, disclination lines easily occur at two sides R of a pixel electrode thereof. Comparing FIGS. 1 and 8, by adopting the pixel structure 1000 according to the first embodiment, problems of disclination lines at the two sides R of the pixel electrode are alleviated. Similarly, by adopting the pixel structure 1000A according to the second embodiment and shown in FIG. 9, problems of disclination lines at the two sides R of the pixel electrode are further alleviated.

Figure 10:
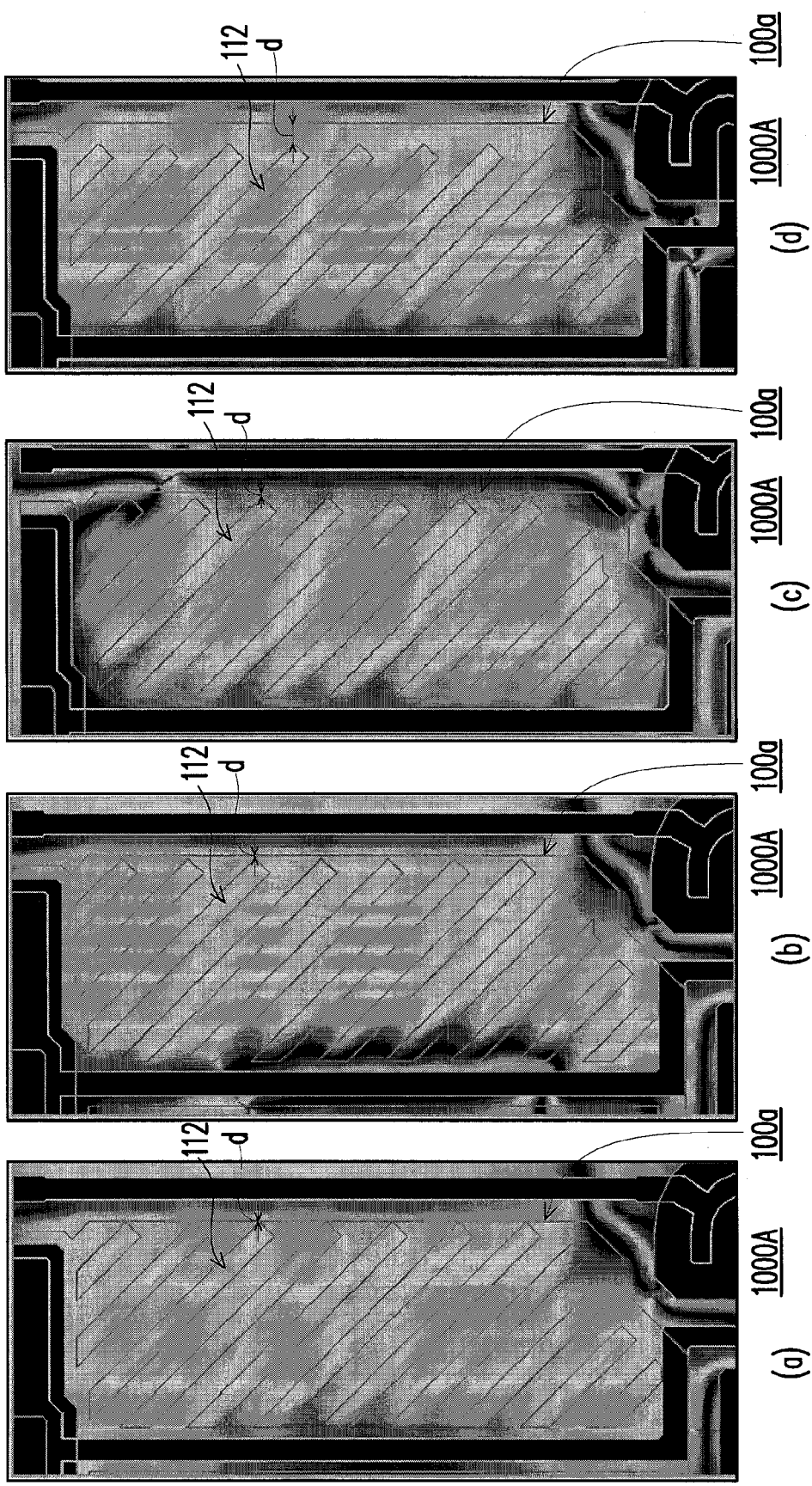
Figure 10:
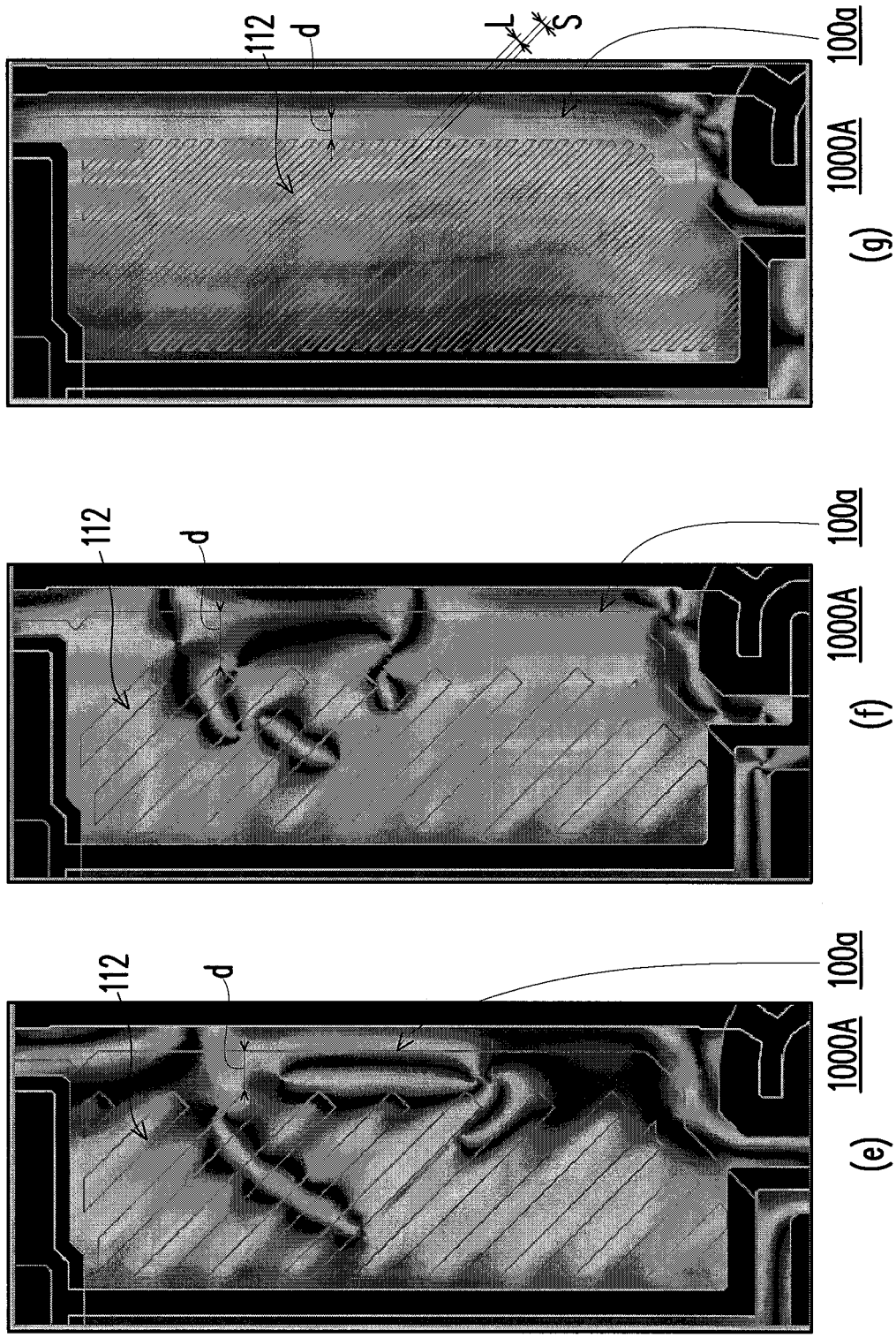

Moreover, please refer to FIGS. 9 and 10. In the pixel structure 1000A according to the second embodiment, a shortest distance between the strip-shaped slits 112 and a side 100a of the pixel electrode is d. The distance d may be adequately designed, so as to optimize transmittance of a display panel which adopts the pixel structure 1000A. For example, FIG. 10 sequentially shows in (a) to (f) how the pixel structure 1000A drives the display medium when d=0.1 μm, d=0.5 μm, d=1 μm, d=4 μm, d=7 μm, and d=10 μm.

According to FIG. 10, (a) to (f), the distance d may be from 0.1 μm to 10 μm, or may also be from 1 μm to 8 μm, or may more preferably be from 1 μm to 7 μm, any of which is able to alleviate the problems of disclination lines at the two sides R of the pixel electrode. Furthermore, comparing (d) and (g) in FIG. 10, when the distance d is fixed at 4 μm, and the width L of the strip-shaped electrodes 142 and the width S of the strip-shaped slits 112 are both reduced to 1 μm (as shown in FIG. 10, (g)), the problems of disclination lines at the two sides R of the pixel electrode are significantly alleviated.

In summary, in the pixel electrode according to the disclosure, by utilizing parts of the non-isosceles trapezoid slits whose extending directions are substantially parallel to each other, the tilting direction of the display medium at the two sides of the pixel electrode is more consistent with the tilting direction of the adjacent display medium which is located in the same pixel electrode, so that a display panel which adopts the pixel structure according to the disclosure is less prone to problems of disclination lines and has superb transmittance.

What is claimed is:

1. A pixel structure electrically connected to a scan line and a data line, the pixel structure comprising:
    an active device electrically connected to the scan line and the data line; and
    a pixel electrode electrically connected to the active device and comprising a plurality of strip-shaped slit groups, wherein each of the strip-shaped slit groups comprises a plurality of strip-shaped slits whose extending directions are substantially parallel to each other, and a contour of at least one of the strip-shaped slits is a non-isosceles trapezoid, and the non-isosceles trapezoid comprises a top base, a bottom base, a first leg, and a second leg, the first leg is near an edge of the pixel electrode, the second leg is away from the edge of the pixel electrode, and the first leg is not parallel to an extending direction of the data line.

2. The pixel structure as claimed in claim 1, wherein the non-isosceles trapezoids are right trapezoids.

3. The pixel structure as claimed in claim 2, wherein the first leg is substantially perpendicular to the top base.

4. The pixel structure as claimed in claim 1, wherein the second leg is substantially parallel or substantially perpendicular to an extending direction of the scan line.

5. The pixel structure as claimed in claim 1, wherein an included angle between the first leg and the data line is substantially 45°.

6. The pixel structure as claimed in claim 1, wherein the pixel electrode comprises:
    a first main electrode part, wherein an extending direction of the first main electrode part is substantially parallel to an extending direction of the scan line;
    a second main electrode part, wherein an extending direction of the second main electrode part is substantially parallel to an extending direction of the data line; and
    a plurality of strip-shaped electrode groups connected to the first main electrode part and the second main electrode part, wherein each of the strip-shaped electrode groups comprises a plurality of strip-shaped electrodes whose extending directions are substantially parallel to each other, so as to define one of the strip-shaped slit groups.

7. The pixel structure as claimed in claim 6, wherein in the same strip-shaped electrode group, parts of the strip-shaped electrodes extend outward from the first main electrode part, and the remaining strip-shaped electrodes extend outward from the second main electrode part.

8. The pixel structure as claimed in claim 7, wherein each of the strip-shaped electrodes has a first end and a second end, each of the first ends is connected to the first main electrode part or the second main electrode part, and each of the second ends has a branch which is connected to the second end of the adjacent strip-shaped electrode.

9. The pixel structure as claimed in claim 7, wherein each of the strip-shaped electrodes has a first end and a second end, each of the first ends is connected to the first main electrode part or the second main electrode part, and each of the second ends has a branch which extends towards but is not connected to the second end of the adjacent strip-shaped electrode.

10. The pixel structure as claimed in claim 7, wherein each of the strip-shaped electrodes has a first end and a second end, each of the first ends is connected to the first main electrode part or the second main electrode part, and the second ends are connected to each other.

11. The pixel structure as claimed in claim 7, wherein each of the strip-shaped electrodes has a first end and a second end, each of the first ends is connected to the first main electrode part or the second main electrode part, and parts of the second ends are connected to each other to form a jagged outer contour.

12. The pixel structure as claimed in claim 7, a width of each of the strip-shaped electrodes being L, and a width of each of the strip-shaped slits being S, wherein $1\ \mu m \leqq L \leqq 8\ \mu m$, and $1\ \mu m \leqq S \leqq 4\ \mu m$.

13. The pixel structure as claimed in claim 7, a width of each of the strip-shaped electrodes being L, and a width of each of the strip-shaped slits being S, wherein $2\ \mu m \leqq L \leqq 7\ \mu m$, and $1\ \mu m \leqq S \leqq 4\ \mu m$.

14. The pixel structure as claimed in claim 7, a width of each of the strip-shaped electrodes being L, and a width of each of the strip-shaped slits being S, wherein $2\ \mu m \leqq L \leqq 6\ \mu m$, and $1\ \mu m \leqq S \leqq 4\ \mu m$.

15. The pixel structure as claimed in claim 7, a shortest distance between the strip-shaped slits and a side of the pixel electrode being d, wherein $1\ \mu m \leqq d \leqq 10\ \mu m$.

16. The pixel structure as claimed in claim 7, a shortest distance between the strip-shaped slits and a side of the pixel electrode being d, wherein $1\ \mu m \leqq d \leqq 8\ \mu m$.

17. The pixel structure as claimed in claim 7, a shortest distance between the strip-shaped slits and a side of the pixel electrode being d, wherein $1\ \mu m \leqq d \leqq 7\ \mu m$.

18. The pixel structure as claimed in claim 1, wherein an included angle between the first leg and the top base is $\alpha$, and $45° \leqq \alpha \leqq 135°$.

* * * * *